United States Patent
Huber et al.

[15] 3,671,618
[45] June 20, 1972

[54] METHOD FOR DRY PRESSING CERAMIC TILE

[72] Inventors: William W. Huber, North Canton; Richard L. Dana, Canton, both of Ohio

[73] Assignee: United States Ceramic Tile Company, Canton, Ohio

[22] Filed: April 30, 1970

[21] Appl. No.: 43,628

Related U.S. Application Data

[62] Division of Ser. No. 636,983, May 8, 1967, Pat. No. 3,523,344.

[52] U.S. Cl. ............................................................264/120
[51] Int. Cl. ...........................................................B28b 3/00
[58] Field of Search .......................................264/120; 25/89

[56] References Cited

UNITED STATES PATENTS

2,855,628  10/1958  Lessman..................................264/120
1,810,078  6/1931   Housman.................................264/120

FOREIGN PATENTS OR APPLICATIONS

726,091  1/1966  Canada....................................264/120

Primary Examiner—Robert F. White
Assistant Examiner—J. R. Hall
Attorney—Daniel W. Sixbey

[57] ABSTRACT

A method is illustrated for dry pressing granular ceramic material in situ by subjecting the material to a first peak pressure, then relieving the pressure on the pressed material while confining the material to retain its general pressed form and subsequently applying pressure to the material which is no greater than the original pressure applied but no less than 75 percent thereof.

7 Claims, No Drawings

METHOD FOR DRY PRESSING CERAMIC TILE

This application constitutes a divisional application of U.S. Ser. No. 636,983 entitled APPARATUS FOR DRY PRESSING CERAMIC TILE filed May 8, 1967, now U.S. Pat. No. 3,523,344 issued Aug. 11, 1970.

BACKGROUND OF THE INVENTION

The present invention relates to a high speed process for forming grandular ceramic material into dry pressed blanks without lamination stratification, or striation, and more particularly this invention pertains to the utilization of this process in an apparatus for the production of ceramic tiles.

Dry pressing may be defined as pressing a finely divided mass of granular material, slightly moistened, into a compressed shape. A major difficulty encountered in the dry pressing of granular ceramic material into ceramic tile is the occurrence of horizontal laminae within the pressed tile and stratifications which tend to occur along a plane parallel to the pressure surface of the pressure platen. In the case of ceramic tile, these laminae often rupture spontaneously when pressures are removed from a tile blank after the pressing operation, or rupture may occur during or after the firing of the tile.

Heretofore it has been believed that laminae were caused in dry pressed ceramic tile by the entrapment of air during pressing, and operating upon this theory, many efforts have been made to avoid this difficulty. For example, prior pressing apparatus have employed numerous operational steps during which ceramic or other granular materials were subjected to successive pressings within a mold and were removed from the mold for the purpose of exhausting air therefrom between successive pressing cycles.

Prior methods and apparatus for producing dry pressed products which include the provision of an air exhaust step have necessarily been limited to a slow, interrupted pressing cycle. For example, one known apparatus for producing dry pressed ceramic tile blanks without lamination has a maximum output of only ten cycles per minute. Since ceramic tile has a relatively low value per unit, any slowing of the production cycle increases production costs to the point where the ceramic tile becomes uneconomical and non-competitive.

It is a primary object of the present invention to provide a novel method for dry pressing granular ceramic material at high speeds without lamination stratification or striation.

A still further object of this invention is to provide a novel method for producing dry pressed ceramic tile free from lamination from finely divided ceramic material by subjecting said material in situ to first and second compression pressures with a controlled pressure release between said pressures.

Those and other objects and details of the invention will be readily apparent upon a consideration of the following specification.

To effectively develop a high speed machine for dry pressing finely divided granular material, it is important that the machine operate upon the material in situ during an uninterrupted pressing cycle to afford high speed conversion of the material. The movement of the material in and out of a mold cavity during a forming operation interrupts and prolongs the operation and prevents the effective achievement of a high speed forming cycle.

To implement the objects of this invention, it is necessary to re-examine the theory that laminae in ceramic tile formed by a dry pressing technique are primarily the result of air trapped during the pressing process. The necessity to remove a blank from a mold cavity during a pressing process to exhaust trapped air must be eliminated if a high speed pressing process is to be achieved.

Our studies in rheology indicate that laminae occurring within blanks formed by a dry pressing process may not be due as much to entrapped air as to the difference between the pressure exerted by the walls of the forming die perpendicular to the face of the pressing platen and that exerted by the platen. For example, in the dry pressing of finely divided ceramic material, pressure is applied to the material within a die cavity by the action of male dies or platens being forced vertically toward each other within a die cavity so that the particles of material are compressed. Since the mass of granular ceramic material from which a dry pressed tile blank is formed is a conglomerate of relatively hard solids, pressures do not equalize throughout the mass as they do in the case of fluids. Instead, as the die platens move vertically and approach each other forcing the finely divided material into a more confined space, pressure forces are created in the die cavity by the lateral movement of the material in the cavity against the unyielding sidewalls thereof. This lateral force within the cavity is the result of the particles in the mass of material being forced between other particles and tending to separate these particles in a horizontal direction.

The compression of the finely divided particles is the result of the particles being forced by the vertically moving platens to fill the spaces within the mass previously occupied by air. Since there is a reasonable clearance between the sidewalls of the die cavity and the approaching male die or platen, air is easily dispelled from the cavity. When substantially all voids within the mass are filled, the particles continue to rearrange themselves in response to increasing vertical pressure in an attempt to fill further voids, the fines being driven into the smaller voids. The more the compression confinement, the greater the lateral movement and the greater the resultant lateral pressure against the sidewalls of the die cavity, and when all possible voids are filled by the rearranging action, the continuation of pressure will result in points within the blank where larger particles attempt to wedge between one another. Some of these particles will be wedged sufficiently to be locked in, while others will lie as blunt wedges as long as pressure is applied.

Throughout the rearrangement and wedging action within the mass of granular material, all the particles are restrained from moving outwardly and away from one another by the sidewalls of the die cavity. This results in the application of tremendous force upon these sidewalls with a resultant production of stress within the compressed part. If the pressure upon the compressed granular mass is maintained for a period of time, the stresses within the mass will tend to lessen as the yield strength of the particles is exceeded, and further distortion of particles takes place with the shearing off of some of the particles within the mass and further rearrangement thereof. This tends to lessen the lateral force applied to the sidewalls of the die cavity.

The combined vertical and lateral forces within the die cavity may be maintained substantially in balance as long as the vertical pressure on the compressed material in the cavity is opposing the lateral stresses resulting from the pressure imposed upon the sidewalls of the cavity. However, to effectively accomplish a high speed dry pressing operation, it is not feasible to maintain this pressure balance until the yield strength of the particles within the compressed mass is exceeded. On the other hand, if the force of the male die is relieved before this point, the static sidewall pressure will act upon the mass to cause a series of horizontal laminae. With a quick release of the vertical pressure on the mass, the accompanying relief of lateral pressure imposes a sudden high compression stress on the sides of the mass which results in vertical expansion and rupture thereof. This rupture disunites the compressed material of the mass, progressing first in the form of horizontal laminated stratifications and, if allowed to progress uncontrolled, finally to complete disintegration and breaking up of the material into granular or flake like form within the die. Often, the shock accompanying a rapid release of vertical pressure from the mass tends to set into motion all particles under stress, including the locked in stresses, and the previously compressed mass will virtually explode.

Regardless of whether lamination stratification in dry pressed ceramic tile is the result of air entrappment, internal pressure inequalities, or even some other factor, it has been found that by discarding the air entrappment theory and the process steps previously considered necessary to eliminate air entrappment, a high speed pressing process may be devised. This process may be effectively implemented by concentrating on eliminating the results of lateral pressure strains within the compressed mass to produce a tile free from lamination stratification by a high speed pressing process.

Basically, the method of the present invention consists of producing a non-laminated ceramic tile by a process of conversion wherein a first pressure is applied to the ceramic material in a tile die to convert such material from a soft, low density, highly mobile dust or finely granulated form to a hard, high density, solid form of low mobility. This first step is followed by a controlled release of the first pressure to permit limited adjustment of the converted mass within the die cavity, and this release step is followed by a second controlled pressure, which is equivalent to or less than the first, to compact the converted mass in the die cavity into a cohesive, solid, non-laminated tile. This entire process is capable of being performed on the mass in situ at high speed during a single, uninterrupted pressing cycle of a tile press.

During the study involved in the formulation of the novel process of this invention, it was found, as previously explained, that if a male die is rapidly removed from the compressed mass after applying a first pressure thereto for a period insufficient to exceed the yield strength of the particles within the mass, the shock of the rapid release tends to set into motion all of the particles under stress. However, it was found that if the male die is caused to move slowly away from the mass in releasing the first pressure, the mass will retain its general shape within the die cavity with the exception that its thickness will be increased to the extent of the stresses relieved. As the stresses are relieved, a series of laminae will result and substantially all of the stresses will be relieved with the exception of the locked in stresses. Therefore, the slow removal of the male die is not effective, for it is desirable to remove substantially all stresses from the compressed mass as well as to increase the speed of the pressing operation.

If the male die is caused to move rapidly away from the compressed mass, the mass might virtually explode, but on the other hand, the more rapid the release of the male die, the more complete is the removal of stress from the compressed mass through the motion of all particles under stress including those subjected to the locked in stresses. Therefore, to achieve effective relief of stress in the compressed part, it is necessary to rapidly remove a male die for a distance which will permit expansion of the compressed part to a point necessary to relieve substantially all internal stresses. However, this expansion must be controlled to prevent disintegration and breaking up of the mass within the die, and therefore it is necessary to maintain the compressed mass in its general compressed shape within the die cavity while relieving the stresses therefrom. If the male die is caused to move away from the mass for a distance greater than that required to substantially release all the stresses while maintaining the mass in its general compressed form, the laminated sections occurring throughout the mass will be misplaced from their original relative positions, and the sections will not remate when a second pressure is applied. Instead, new stresses will be formed which will cause laminae stratification in the finished product.

After the stresses in the mass are relieved, a second pressure is applied to the laminated sections of the mass, and these sections are remated, particle for particle, to form their original shape. This second pressure must be of sufficient amplitude to form a coherent mass, but it is imperative that the second pressure be no greater in amplitdue than the first. This second pressure is being applied to a series of horizontal sections formed by particles whose horizontal movement has been fixed by the first pressure, and therefore, the particles within these sections tend to resist further horizontal movement as long as the pressure applied thereto does not exceed that of the first pressure. Thus, few internal lateral stresses result within the mass of granular material during the second application of pressure thereto, and no internal stresses are present which are of sufficient strength to cause stratified laminae in the mass upon removal of the second pressure. Thus, as the second pressure is released, there is no perceptible expansion of the mass nor is there any noticeable horizontal expansion of the part when ejected from the die cavity.

If, during the pressure release stage between the successive applications of pressure to the granular mass, the male die is allowed to move away from the mass to a point sufficient to allow the laminated sections to become misplaced from their original position, new internal stresses will be formed within the mass when, upon the application of the second pressure, the sections fail to remate. In this case, the removal of the second pressure from the mass will again result in stratified laminae being formed in the compressed blank. It is imperative that the expansion of the mass be carefully controlled during the pressure release stage of this process and that substantially all stress be relieved to prevent the subsequent formation of additional laminae.

The novel process of this invention may be better understood by briefly considering the state of change experienced by the mass of finely divided material as the process proceeds. The original material introduced into the die cavity is in powder or dust-like form, and to effectively carry out the process, it is necessary to attempt to distribute the material evenly throughout the cavity. Since there is no flow quality to dry pressed ceramic material, any portion of the cavity containing an appreciable amount of material more than another portion thereof will cause the mass to be subjected to unequal pressures.

If unequal pressures are applied to the mass, laminae formed in the lesser compressed portions of the mass after the application of the first pressure of this method would not become knitted by the second pressure, because the greater compressed portions would receive the full pressure load. This prevents equal force from being applied to the lesser compressed portions of the mass to achieve proper mating between the laminae thereof.

Once the dust-like ceramic material had been evenly distributed in the die cavity, the male die must be introduced into the cavity at a speed just below that which would cause the dispelled air to blow the material particles from the cavity. Considerable air must be dispelled during the pressing operation, and the only escape of air as the male die enters the cavity is between the die and the cavity walls. Since this clearance is small, an excessively rapid entry of the male die causes the air to rush through this opening at a high velocity, and this stream of air tends to carry with it particles lying close to the sidewalls of the cavity. This in turn causes the edges of the compressed mass to be compressed to a lesser degree during the first pressing step of this process with the results previously described.

The male die continues to enter the die cavity until it contacts the finely divided material and exerts the desired peak pressure to accomplsih the first pressing stop of this method. For conventional ceramic tile with a thickness within the range of ¼ to ½ inches, it is found that this first peak pressure should be within the range of from 1,500 to 4,000 p.s.i. Of course, this peak pressure range varies with the thickness and type of material employed in the pressing process, and the use to be made of the end product obtained from the pressing process.

The application of the first peak pressure of the process converts the previously soft, light-weight, mobile material to a hard, dense, solid. In cross section, this solid mass resembles a plurality of flat, interleaved scales similar to fish scale. While the total weight is unchanged, this material mass is now less subject to lateral movement under vertically applied pressure in this metamorphized form. Pressing the mass may be equated to pressing the top of a deck of cards, for pressure upon the deck will result in little or no lateral movement of the cards.

In its new form, after the release of the initial pressure in the die cavity, the previously finely divided material now constitutes pre-compressed and harder material which has a higher bulk density and occupies a much smaller space than the original uncompressed, dust-like material. Hence, the compression necessary to close the laminated voids of this denser material to form a cohesive solid requires much less vertical and resultant lateral movement of the mass then occurred in its original compression. The resistance of the mass in its new form to lateral movement upon the application thereto of like or lower pressure than that applied during the first pressing results in less stress imposed by the compressive forces on the side walls of the die cavity. This reduced stress reduces the lateral strains on the material to a point below the critical compressive stress of the material, thereby avoiding the occurrence of pressure cracks or horizontal laminated stratifications in the finished tile blank.

The second pressing step has been found to eliminate substantially all laminae stratification in a finished ceramic tile if the peak pressure applied during this step is maintained within the range of from 75 to 100 percent of the peak pressure in the initial pressing step. It has been found that this pressure range is sufficient to eliminate the stratifications occurring in the tile after the first pressure step, and as previously explained, it is essential that the second peak pressure does not exceed that of the first pressure step.

By employing the novel method of this invention, it is possible to successfully produce dry pressed ceramic tile from the highly mobile ceramic material dust at high compression pressures and at high speeds. Actually, the rate of speed at which this process is performed has not been found to be a limiting factor in the production of an acceptable tile product, and the only limit thus far noted on the pressing speed is that imposed by the limitations on the die entry speed into the mold cavity.

Additionally, the method of this invention eliminates the necessity for subjecting the powdered material to be pressed to a number of predensification steps in preparation for the pressing operation. It has generally been the practice in the pressing of powder material, particularly in the case of powdered ceramic material, to pellitize the material in a series of predensification steps prior to pressing. This densification of the material is necessary if an acceptable blank is to be obtained by the known pressing techniques.

The novel method of the present invention accomplishes densification and pressing of the powdered material in one step. The first maximum pressure on the material accomplishes the densification step and the second pressure the pressing step. Additionally, the densification step achieved by the method of this invention leaves the individual laminated sections within the densified mass in the form of flat laminae or scales which are not separated by the voids which occur between the pellets or granular particles formed by conventional prepellitizing densification methods. Thus, under the present method, the densified mass is formed for a second pressure step wherein the laminae will knit with the formation of minimal lateral strain within the mass. This is not accomplished with conventional predensified material, for the pellets formed by known methods move laterally within the mass during pressing.

What we claim is:

1. A method for press forming finely divided substantially dry particulate ceramic material within a mold cavity by use of a mold platen for pressing the material within the mold cavity to form a solid cohesive mass wherein the particles of material are forced to displace the air in said mass which is expelled from the mold cavity at the edges of said platen, said ceramic material having the capability of being pressed into a hard, high density solid form when subjected to sufficient pressure and being subject to the formation of lamination stratification and striation when such pressure is relieved, including the steps of inserting the particulate ceramic material to be pressed in the mold cavity to form a low density mass;

subjecting said mass to a first pressure by inserting the mold platen to a first pressure position within the mold cavity against said mass to apply pressure thereto of an amplitude and for a time sufficient to create internal stress in said mass and to press said mass into the general form of the mold cavity; reducing the pressure on said mass by retracting the mold platen from said first pressure position at a speed and to an extent sufficient to substantially relieve all internal stress in said mass thereby to cause a plurality of flat laminae to form in said mass extending along a plane substantially parallel to said pressure surface;

terminating the retraction of the mold platen at a second position within the mold cavity in order to maintain the mold platen in contact with said mass to limit the expansion thereof and to maintain the mass in general pressed form set by said first pressure; and reinserting the mold platen to a third pressure position within the mold cavity to subject said mass to a second pressure to mate the laminations formed therein and convert said mass to a solid, cohesive form, said second pressure being of a magnitude which is no greater than said first pressure.

2. The method of claim 1 wherein said first pressure is achieved by moving the mold platen into contact with said mass to initially apply a gradually increasing pressure to said mass at a first rate to permit air to be dispelled from said mold cavity during a first instant of time and subsequently moving said mold platen to said first pressure position to increase the pressure on said mass to said first pressure at a second rate faster than said first rate.

3. The method of claim 1, wherein said mold cavity has a side wall and said first pressure on said mass is relieved to a pressure substantially equal to the pressure exerted by said mass on the side wall of said mold cavity by the release of said internal stresses.

4. The method of claim 3 wherein said first pressure is released before the yield strength of the particles within said finely divided material is exceeded.

5. The method of claim 1 wherein said second pressure is of a magnitude which is within the range of from 75 to 100 percent of that of said first pressure.

6. The method of claim 5 wherein said finely divided particulate material is introduced in the mold cavity to a depth sufficient to form a pressed blank having a thickness within the range of ¾ to ½ inches, the first pressure applied to said ceramic material being of a magnitude within the range of from 1,500 to 4,000 psi.

7. The method of claim 5 wherein said first pressure is achieved by initially applying a gradually increasing pressure at a first rate to said mass to permit air within the mold cavity to be dispelled and subsequently increasing the pressure at a second rate faster than the first rate to reach the full magnitude of said first pressure.

* * * * *